United States Patent [19]

Terai et al.

[11] 4,330,344

[45] May 18, 1982

[54] SELECTIVE ABSORBER OF SOLAR ENERGY AND PROCESS FOR PRODUCING SAME

[75] Inventors: Shiro Terai; Toshio Amitani; Toshio Suzuki; Katsuhiko Hirata; Makoto Andoh, all of Nagoya, Japan

[73] Assignee: Sumitomo Light Metal Industries, Ltd., Tokyo, Japan

[21] Appl. No.: 221,060

[22] Filed: Dec. 29, 1980

[51] Int. Cl.³ ............................. C23F 7/26; C23F 7/06
[52] U.S. Cl. ..................................... 148/6.2; 148/6.27; 148/6.3; 148/6.16; 427/160
[58] Field of Search ........................ 148/6.2, 6.3, 6.27, 148/6.16; 427/160

[56] References Cited

U.S. PATENT DOCUMENTS 2,544,139  3/1951  Deyrup et al. ...................... 148/6.2

*Primary Examiner*—Ralph S. Kendall
*Attorney, Agent, or Firm*—Browdy and Neimark

[57] ABSTRACT

A selective absorber of solar energy using an aluminum alloy sheet as a substrate on which a chemical conversion coating is initially formed. The coating is subsequently oxidized into a dark-colored coating of selective solar absorption nature. Also disclosed is a process which comprises a chemical conversion treatment step for formation of the initial coating, and a high-temperature oxidation treatment step for final formation of the selective coating for solar energy absorption.

17 Claims, No Drawings

SELECTIVE ABSORBER OF SOLAR ENERGY AND PROCESS FOR PRODUCING SAME

BACKGROUND OF THE INVENTION

1. Field of the Invention

This invention generally relates to a spectral-selective solar energy absorber or collector and a process for producing the same, and more particularly to a process for easily and economically forming with high reproducibility a spectral-selective coating or film on a surface of an aluminum substrate or base material so as to efficiently utilize the solar energy.

2. Description of the Prior Art

With the recent oil crisis as a turning point, an aggravating exhaustion of energy resources, particularly fuel oil, has been increasingly a serious problem, which has necessitated and accelerated the pace of various efforts and research directed toward maximum utilization of all energy resources available in many different forms. Among the presently available energy resources, solar energy or heat has been and is considered to be one of the most easily or readily usable energy sources available anywhere on the earth, and thus there is demand to rapidly develop and establish technologies for effective utilization of the solar energy. The solar energy is generally obtained in the form of heat usually absorbed by a black or dark-colored surface of a body, for example, a surface coated with a thin film of a black paint. While such a conventional heat absorbing surface or coating is efficient in terms of selective absorption of solar energy, its high emissivity nature creates a problem of energy loss, i.e., the solar energy or heat absorbed by such a surface tends to be emitted or radiated as infrared rays. This results in the failure in effectively conducting the absorbed solar heat to a suitable medium such as water, that is the temperature of the water can not be elevated in a sufficiently effective manner by transfer of the heat from the absorbing surface to the water. Thus, the conventional solar energy absorbing surface with a black paint coating per se is limited in its application and therefore suffers a potential disadvantage of being incapable of efficiently utilizing the solar energy.

To solve the above indicated problem and disadvantage, it is an important requirement to develop a spectral-selective solar energy absorbing surface or absorber which is characterized by its high absorptance of the solar energy, particularly in the visible and near-infrared regions which are a major portion of the solar spectrum, as well as by its low emissivity in the long wavelength (infrared) region, the said selective absorber having, in other words, optical properties which assure sufficient absorption of the solar light (high solar absorptance nature) and less thermal emission from the absorbing surface (low thermal emissivity nature).

As a result of extensive study and research of a selective coating or film, made under such situation, the inventors of the present invention had found a novel process usable for forming, on a substrate of an aluminum material, black coatings which are capable of efficient selective absorption of the solar energy, for which a Japanese patent application was filed as TOKU-GAN-SHO No. 53-62480 (published as TOKU-KAI-SHO No. 54-153348). This process comprises a step of pre-treating a surface of an aluminum (Al) alloy containing magnesium (Mg) to provide a specular reflectance of higher than 98%, and a subsequent step of carrying out an oxidation treatment of the alloy surface at elevated temperatures from 490° to 550° C. in order to form an oxidized coating on the surface of the alloy, thereby making it possible to obtain an oxidized, black-colored coating that demonstrates excellent properties of solar absorptance and specular reflectance. On the other hand, the same process has simultaneously disadvantages such as complexity in pre-treating the substrate surface for adjustment of its specular reflectance to higher than 98%, and the consequent increase in the required number of steps for practicing the process. The process has a further disadvantage of low reproducibility in relation to colouration of the thus formed coating. To put the above process into practice, it is necessary to overcome those inherent disadvantages thereof.

SUMMARY OF THE INVENTION

The present invention has been completed on the basis of further novel teaching and knowledge given as a result of the continued study and research by the present inventors with respect to their previously made invention.

It is accordingly the primary object of the present invention to provide a spectral-selective solar energy absorbing surface or absorber having an increased efficiency in selective solar energy absorption.

It is an object of the present invention to provide an improved process for economically producing a spectral-selective solar energy absorbing surface or absorber having an efficient selective solar energy absorption nature.

It is another object of the present invention to provide a process for easily and economically forming with high reproducibility a selective coating or film on a surface of an aluminum substrate or base material so as to efficiently utilize the solar energy.

It is a further object of the present invention to provide a process for producing a selective solar energy absorber without a considerable amount of work for pretreating a surface of an aluminum material used as a substrate.

Other objects of the invention will become apparent from the following detailed description.

To attain the above objects, the present invention is characterized in that a smooth surface of an aluminum (Al) alloy containing magnesium (Mg) is first chemically treated to form thereon a chemical conversion coating including chromium (Cr), and then the Al alloy is subjected to an oxidation treatment at an elevated temperature ranging from 400° to 600° C. in order to convert the previously formed chemical conversion coating into an oxidized, dark-colored coating, whereby selective solar absorbers with an increased selective solar absorptance may be obtained economically with ease of processing and high reproducibility.

Thus, in accordance with this invention, the chemical conversion and oxidation treatments of the surface of the aluminum material and the resultant action of the magnesium contained in the material itself and the chromium introduced during the chemical conversion treatment, permits easy and reproducible formation of blackened selective coatings, i.e., black or dark-colored (colors having a hue nearest to black) coatings having an extremely high solar absorptance and an extremely low emissivity in the infrared region of the solar spectrum. The selective absorbers possessing such excellent selective coating may be sufficiently provided by means of using, as a substrate, aluminum alloy sheets whose surface has such sufficient degree of smoothness and brightness that may be obtained without having to specially adjust the reflectance of the surface to the conventional standard of higher than 98%, whereby the production process may be significantly simplified.

DETAILED DESCRIPTION OF THE INVENTION

The substrates used in accordance with this invention are Al alloy materials containing Mg, the Mg content generally ranging from about 0.1 to several percentages or exceeding the latter value as the case may be. The oxidized coating obtained through the later described oxidation treatment at a high temperature will become darker in color and better in quality as the Mg content in relation to the Cr content is increased. However, since materials generally become harder and their processability is reduced as the Mg content thereof is increased, the Al alloy materials as a substrate have their own upper limit of the Mg content which varies depending upon a degree of processability required by specific Al alloy materials. Notwithstanding the above presumption, the present invention enables a substrate of Al alloy material with a comparatively small Mg content, say lower than about 5%, specifically about 3%, to be provided with a dark-colored efficient selective coating thanks to an outstanding feature of the invention that the first formed chemical conversion coating is blackened by means of the interaction between Mg and Cr during the oxidation treatment at an elevated temperature. This is supported by the fact that the materials with less Mg content are accordingly easier to process, and explains the reason why it is possible to use as a substrate bright aluminum alloy material in the as-rolled form, the surface of which is smoothed during cold rolling of the materials into sheets. In this connection, it is recognized that components other than Mg of the Al alloy such as copper (Cu), zinc (Zn) and manganese (Mn) have substantially no effect on formation of a selective coating in accordance with this invention.

Although it has been conventionally a common practice that Al alloy materials as substrates containing Mg must have a smooth surface to provide a selective surface with minimum emissivity ($\epsilon$) in the infrared region, and that the surface of the substrate is brightened to obtain such smoothness, the Al alloy substrates for use in accordance with this invention need not be subjected to any special brightening process to meet the conventional critical requirement of keeping the reflectance at a 98% or higher level. The minimum required specular reflectance at a 60-degree incident angle of the substrate surface of this invention is approximately 50% or preferably 60%. Thus, the present invention makes it possible to use as-rolled Al sheets whose surface is brightened and smoothed during the cold rolling process to a satisfactory level of specular reflectance (usually, 60 to 65%). In other words, the present invention has eliminated the conventional need of using special methods for brightening the substrate surface such as buffing, chemical polishing and electrolytic polishing. Of course, the benefit of using such brightening methods is by no means negated in this invention since the emissivity ($\epsilon$) or reflectance of the selective coating of the invention is reduced as the smoothness and brightness of the substrate surface are enhanced. In connection with the use of the brightening methods, the instant invention offers a feature that the substrate surface brightened with such methods will not be adversely affected by subsequent formation of a particular oxidized coating thereon.

While the magnesium-containing Al alloy material, used as a substrate, is degreased as required depending upon the extent of blur or stain on the surface, it is naturally a must to use a neutral detergent or other non-etching degreasing agent to prevent damaging the bright and smooth surface of the substrate. After the surface is degreased, it is washed in water to rinse out the degreasing agent left thereon.

Following the water rinsing, the cleaned and smooth surface of the Al alloy substrate is chemically treated in accordance with this invention to form a chemical conversion coating thereon. This chemical conversion treatment of the substrate surface is carried out under the chromate or chromate-phosphate process in a commercially available mixture solution known, for example, as Alodine (manufactured by Nippon Paint Co., Ltd.) or Bonderite (manufactured by Nippon Perkerizing Co., Ltd.), containing chromate and/or dichromate and commonly used for preliminary treatment of Al sheets prior to painting the same, thereby forming on the substrate surface a chemical conversion coating which includes chromium (Cr) in the form of chromium oxides or chromium phosphate. In more detail, the chromate process is a process in which a coating is formed chemically by immersing the substrate in a solution whose main component is chromate and/or dichromate, and the chromate-phosphate process is a process in which a coating is formed chemically in an acidic aqueous mixture solution of chromate and phosphate or dichromate and phosphate which mixture solution may contain fluoride. While the required Cr content of the chemical conversion coating may well be almost the same as used in ordinary pre-painting treatments of Al alloy sheets, it is generally preferred that the total Cr content of the coating on the substrate surface be held within an approximate range from 10 to 100 mg per square meter. If the Cr content is less than required, a sufficient effect of the chromium would not be obtained. On the contrary, the chromium has an adverse effect on later described colouration or blackening of the oxidized coating if the Cr content is more than necessary. The Al alloy material, after subjected to such chemical conversion treatment, is rinsed in water to remove the chemical agent adhered to the surface and then air-dried at a room or an elevated temperature to remove the rinsing water off the cleaned surface.

In the next step, the Al alloy substrate containing Mg, on which the chemical conversion coating containing Cr is formed, is subjected to an oxidation treatment at a high temperature of 400° C. or above, so that a black selective coating is finally formed on the substrate surface. This lower temperature limit for oxidation treatment is determined on the basis of the fact that it is difficult, at a temperature below 400° C., to obtain a black coating having an intended selective absorption nature. Further, it must be avoided to perform the oxidation treatment at a temperature exceeding 600° C., which will induce such problems as loss of selective absorption nature of the selective coating, and roughening of the coating surface that may result in loss of relative specular glossiness and increased thermal emissivity of the selective coating. The preferred range of temperature for the oxidation treatment is from 450° to 550° C. It is generally preferable that the above oxidation treatment at a temperature within such range be continued for a period of more than one minute. The duration of the treatment, however, need not be so long, i.e., about 30 minutes at the longest. Under such high-temperature oxidation treatment process, and by means of the interaction between the magnesium (Mg) contained in the Al alloy material and the chromium (Cr) introduced into the chemical conversion coating during the previously described chemical treatment, a sufficiently dark-colored coating of efficient selective absorption nature may be highly reproducibly formed on the surface of the Al alloy material. More particularly, the additional use of Cr together with Mg allows the coating, under the chemical conversion treatment, to be darker in color and gives better selective thermal absorptance than in the case where Mg in the Al alloy sheet is alone used as a substance which contributes to the oxidation treatment. In this connection, an analysis of the composition of such oxidized coating as obtained in accordance with this invention, reveals that the coating is composed of Al, Mg, Cr, O and other components which are chemically combined. The thickness of such oxidized coating is generally not more than about $1\mu$. A coating of more than about $1\mu$ thickness will have reduced selective solar absorptance.

As disclosed above, the coexistence of Cr with Mg in accordance with the invention facilitates formation of extremely efficient spectral-selective coating or film on the surface of a substrate of aluminum materials. Further, according to this invention, selective solar energy absorbers may be reproduced uniformly and consistently in quality by controlling both the Cr amount used in the chemical conversion treatment and the substantive temperature of the substrate surface during the oxidation treatment. In addition, a considerable reduction in production cost of the absorbers mainly due to great simplification of the required process, may also attach an outstanding industrial significance to this invention.

The present invention will be more clearly understood with reference to the following examples. These examples, however, are not to be construed to limit the scope of the invention. Unless otherwise specified, percentages given in the examples are to be understood as percent by weight.

EXAMPLE 1

A cold-rolled Al alloy sheet AA5252 (containing 2.5% of Mg and having 60-degree specular reflectance of about 60%), the surface being smoothed during the cold rolling, was first degreased with a non-etching degreasing agent Dipsole Al #47 (available from Tohei Kagaku Co., Ltd.), rinsed in water, and then immersed in a chromate-phosphate based mixture solution of Alodine 401/45 (available from Nippon Paint Co., Ltd.) at 40° C. for a 30-sec. period, so as to form on the surface thereof a chemical conversion coating containing Cr. The total chromium content of the formed coating was 25 mg per square meter. The Al alloy sheet covered with this chemical conversion coating was again rinsed in water, air-dried at a room temperature, and then heat-treated for a 20-min. period in air at 500° C. whereby the chemical conversion coating was oxidized into a bluish black coating. This coated Al sheet demonstrated efficient selective solar energy absorption properties; solar absorptance ($\epsilon$)=0.90, thermal emissivity ($\epsilon$)=0.07.

EXAMPLE 2

A similar Al alloy sheet (containing 2.5% of Mg and having 60-degree specular reflectance of about 60%) as used in Example 1, was similarly degreased and rinsed in water, and then immersed in a chromate-based mixture solution of Bonderite 712 (available from Nippon Perkerizing Co., Ltd.; the mixture solution containing chromic acid, nitric acid, fluoride, etc.) at 40° C. for a 20-sec. period so as to form on the surface thereof a chemical conversion coating containing a 70 mg quantity of Cr per square meter. Following this chemical conversion treatment, the Al alloy sheet was subjected to a high-temperature oxidation treatment under similar conditions as established in Example 1 whereby the chemical conversion coating was oxidized into a dark-colored coating. This coated sheet thus obtained exhibited selective solar energy absorption properties of 0.85 absorptance and 0.10 emissivity.

EXAMPLE 3

A cold-rolled, bright-surfaced Al alloy sheet AA5-N01 (containing 0.5% of Mg and having 60-degree specular reflectance of about 65%) was chemically treated in the same manner as in Example 1 to form a chemical conversion coating thereon, and then subjected to an oxidation treatment within an electric furnace at 550° C. for a 30-min. period whereby the chemical conversion coating was oxidized into a dark-colored coating. This coated sheet showed selective solar energy absorption properties of 0.85 absorptance and 0.05 emissivity.

EXAMPLE 4

Various kinds of smooth-surfaced Al alloy sheets containing different quantities of Mg as listed in Table 1, were subjected to chemical conversion and high-temperature oxidation treatments under similar conditions as used in Example 1, whereby an oxidized coating was finally formed on the surface of each sheet. Table 1 also lists the measurements made of solar absorptance ($\alpha$) and thermal emissivity ($\epsilon$) of each of the coated sheets thus obtained:

TABLE 1

| Aluminum Alloy Sheets (Substrates) | | | |
|---|---|---|---|
| The Aluminum Association Codes | Magnesium Content (Wt-%) | Solar Absorptance ($\alpha$) | Thermal Emissivity ($\epsilon$) |
| AA1050 | 0 | 0.21 | 0.02 |
| AA3002 | 0.1 | 0.70 | 0.06 |
| AA5N01 | 0.5 | 0.83 | 0.05 |
| AA5252 | 2.5 | 0.90 | 0.07 |

As is clearly shown in Table 1, the sheet (AA1050) which contains no Mg at all could not obtained an oxidized, dark-colored coating and was accordingly extremely low in solar absorptance ($\alpha$). To the contrary, the sheet (AA 3002) which contains a slight amount of Mg had an oxidized coating that was blackened under the influence of Cr applied during the chemical conversion treatment, and was given an improved solar absorptance ($\alpha$) of 70%.

EXAMPLE 5

An examination was made of the result of colouration of oxidized coatings formed on the same Al alloy sheets as used in Example 1 (containing 2.5% of Mg and having 60-degree specular reflectance of about 60%), one of which was subjected to a chemical conversion treatment in a solution containing Cr, and the other was not. More particularly, the influence of Cr upon properties of the oxidized coatings was checked in terms of solar absorptance ($\alpha$) and thermal emissivity ($\epsilon$). The result is indicated in Table 2. As is apparent from Table 2, the use of Cr in the chemical conversion treatment, in other words, the provision of chemical conversion treatment in a Cr-based bath, made a great contribution to enhancement of colouration and improvement of selective solar energy absorption nature of the oxidized coating.

TABLE 2

| Total Cr Amount (mg/m$^2$) | Solar Absorptance ($\alpha$) | Thermal Emissivity ($\epsilon$) |
| --- | --- | --- |
| 0 | 0.72 | 0.04 |
| 20 | 0.93 | 0.09 |

EXAMPLE 6

The same Al alloy sheets are used in Example 1 (containing 2.5% of Mg and having 60-degree specular reflectance of about 60%) were subjected to a chemical conversion treatment with the same amount of Cr (Cr amount in the chemical conversion coating being 25 mg per square meter) and to an oxidation treatment at three different temperatures, respectively, and the influence of the temperature upon the solar absorptance ($\alpha$) of the oxidized coating was examined. The result is shown in Table 3.

TABLE 3

| Oxidation Treatment Temperature (°C.) | Solar Absorptance ($\alpha$) |
| --- | --- |
| 400 | 0.6 |
| 460 | 0.88 |
| 520 | 0.90 |

What is claimed is:

1. A process for producing a selective absorber of solar energy, which comprises the steps of
    subjecting a smooth-surfaced substrate of an aluminum alloy material, containing at least about 0.1% by weight of magnesium and having a specular reflectance of at least 50% at an incident angle of 60°, to a chemical conversion treatment in an aqueous solution containing chromate and/or dichromate to form a chromium-containing chemical conversion coating on a surface of said substrate, and
    subsequently subjecting the substrate to an oxidation treatment at a temperature of 400°-600° C. and for a time sufficient to convert said chemical conversion coating into an oxidized, dark-colored coating having high solar absorptance and low thermal emissivity.

2. A process as claimed in claim 1 wherein said substrate of aluminum alloy material contains 0.1-5 wt% of magnesium.

3. A process as claimed in claim 2 wherein said substrate of aluminum alloy material has about 60% or higher specular reflectance at an incident angle of 60 degrees.

4. A process as claimed in claim 3 wherein said chemical conversion coating formed on the surface of said substrate of aluminum alloy material by said chemical conversion treatment contains chromium in an amount of 10-100 mg per square meter.

5. A process as claimed in claim 4 comprising the preliminary steps, prior to said chemical conversion treatment in aqueous chromate and/or dichromate, of degreasing said smooth-surfaced substrate using a neutral detergent or other none-etching degreasing agent, and rinsing with water to remove any residual degreasing agent.

6. A process as claimed in claim 1 wherein said oxidation treatment is carried out at a temperature of 450°-550° C.

7. A process as claimed in claim 1 wherein said oxidation treatment is continued for a period of 1-30 minutes.

8. A process as claimed in claim 1 wherein said selective absorber has solar absorptance of not less than 0.83.

9. A process as claimed in claim 1 wherein said selective absorber has thermal emissivity of not more than 0.10.

10. A process as claimed in claim 1 wherein said selective absorber has solar absorptance of not less than 0.85 and thermal emissivity of not more than 0.10.

11. A process as claimed in claim 1 wherein said chemical conversion treatment is carried out in an acidic aqueous solution containing chromate and/or dichromate.

12. A selective absorber of solar energy obtained from a smooth-surfaced substrate of an aluminum alloy material containing at least about 0.1% by weight of magnesium, having an oxidized, dark-colored coating having a solar absorptance of at least 0.70 and which is provided by conversion, through an oxidation treatment at a temperature of 400°-600° C., from a chromium-containing chemical conversion coating formed on a surface of said substrate, having a specular reflectance of at least 50% at an incident angle of 60°, by a chemical conversion treatment.

13. A selective absorber as claimed in claim 12 wherein said chemical conversion coating contains chromium in an amount of 10-100 mg per square meter.

14. A selective absorber as claimed in claim 1 having a solar absorptance of not less than 0.83.

15. A selective absorber as claimed in claim 14 having a thermal emissivity of not more than 0.10.

16. A selective absorber as claimed in claim 12 wherein said oxidized, dark-colored coating has a thickness not exceeding 1$\mu$.

17. A selective absorber as claimed in claim 12 having a solar absorptance of at least 0.85 and a thermal emissivity no greater than 0.10.

* * * * *